Dec. 19, 1944. A. J. DORY 2,365,628
ARTIFICIAL FISHING LURE
Filed April 30, 1942
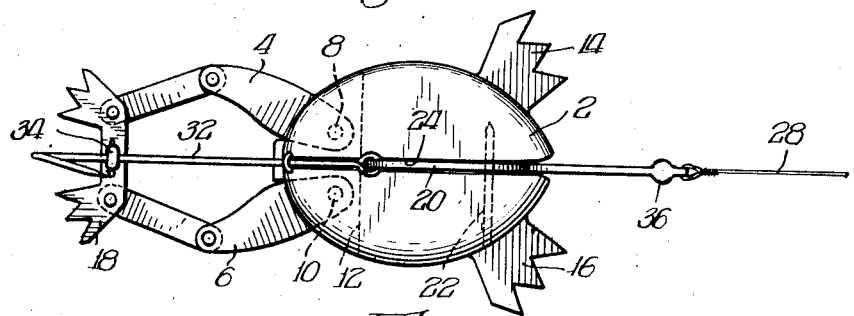
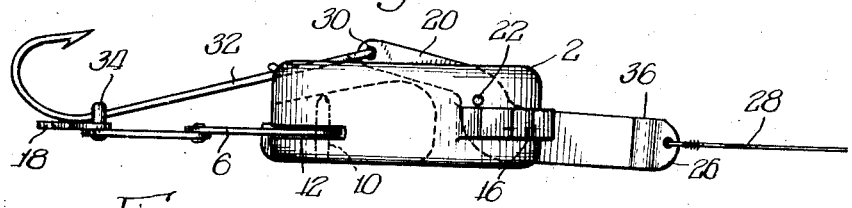
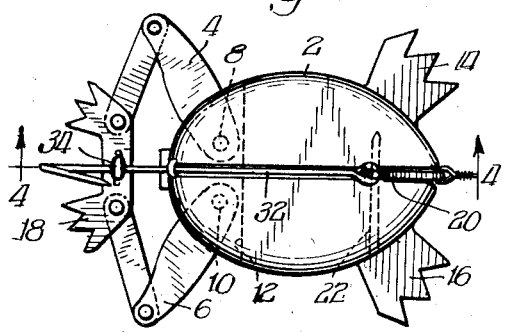
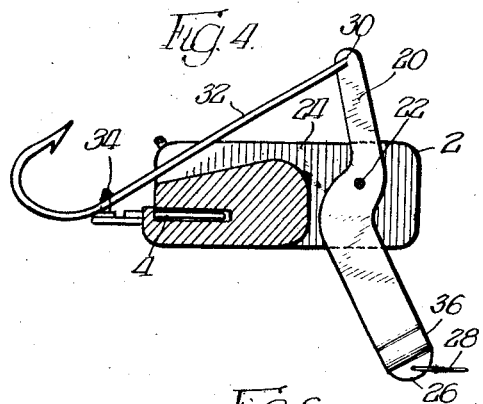
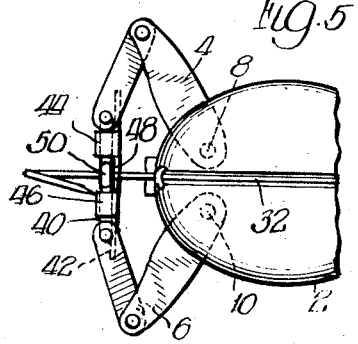
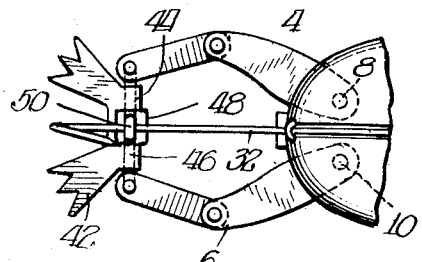
INVENTOR.
Albert J Dory,
BY
Wilkinson Huxley Byron & Knight Patented Dec. 19, 1944

2,365,628

UNITED STATES PATENT OFFICE 2,365,628

ARTIFICIAL FISHING LURE

Albert J. Dory, Chicago, Ill.

Application April 30, 1942, Serial No. 441,071

8 Claims. (Cl. 43—42)

The present invention relates to fishing tackle and more in particular to novel improvements in artificial lures.

Among the objects of the present invention is to provide an artificial lure of simplified construction, which closely simulates natural food for fish, and wherein the said lure is formed with articulated body members which have movement closely approaching the movement of similar members of the said natural food for fish.

Another object of the present invention is to provide a novel improvement in artificial fishing lures, which are of simplified construction involving the use of a minimum amount of strategic materials, and which can be made of plastics, wood and other like similar material, properly colored to simulate any particular natural bait desired.

As a further object, the present invention comprehends a novel artificial lure in which certain articulated elements or members are moved in a predetermined manner to simulate the natural bait when the same is moved forwardly in water.

Still another object of the present invention is to provide a novel artificial lure having articulated body elements to which means is connected for moving said body elements.

More in particular, the present invention in one of its various forms involves the use of articulated body elements pivotally connected to the body of the lure, and which articulated body elements are moved through suitable means forming a connection for a fishing line to the said lure.

The invention in another of its forms comprehends the immediately above identified structure in combination with suitable means operating to propel the lure upon initiating forward movement of the same in water, and which such means is rendered inoperative upon further movement of the articulated body elements.

Another object within the purview of the present invention is to provide a novel artificial lure having articulated body elements, the movement of which is initiated through the medium of a fishing line, and in which means is provided to return the said articulated body elements from their normal extended position to their normal unextended position adjacent the body, whereby the device may by proper manipulation simulate a cyclic series of movements of natural bait.

Other objects, features, capabilities and advantages are comprehended by the invention, as will later appear and as are inherently possessed thereby.

Referring to the drawing:

Figure 1 is a top plan view of an artificial fishing lure made in accordance with the present invention;

Figure 2 is a view in side elevation of the lure shown in Figure 1 of the drawing;

Figure 3 is a top plan view of the artificial lure shown in Figure 1, except that the articulated body elements are in their unextended position;

Figure 4 is a view in cross section taken in the plane represented by line 4—4 of Figure 3 of the drawing;

Figure 5 is a fragmentary top plane view showing an artificial lure conforming substantially to that shown in Figures 1 to 4, with further additional features in accordance with the present invention;

Figure 6 is a fragmentary top plan view of the artificial fishing lure shown in Figure 5 of the drawing, but showing the articulated body elements in their extended position.

Referring now more in detail to the drawing, an embodiment selected to illustrate the present invention is shown in Figures 1 to 4 as comprising a body 2, and articulated body elements 4 and 6 pivoted or hinged as at 8 and 10, respectively, to the body 2 and operable within a horizontal slot 12 disposed toward the rear end of said body 2. In accordance with the showing in Figures 1 to 4, the improvement herein disclosed is shown in connection with a lure simulating a frog, which is further provided with forwardly and laterally disposed elements 14 and 16 representing the forward legs thereof. It is to be understood, however, that the invention may take various forms to simulate other natural food for fish, without departing from the invention. The body 2 is conveniently made of wood, properly balanced to float upon the surface of the water, and the same may be manipulated as will be hereinafter more fully set forth.

According to the present invention, the lure is so constructed that the articulated leg members 4 and 6 are moved to simulate the movement of similar elements of a frog to give lifelike action thereto, so as to attract fish. It will be noted that in the embodiment of Figures 1 to 4, the leg elements 4 and 6 are interconnected by the cross member 18, having rearwardly extending projections shaped to conform substantially to the feet of a natural frog. Movement of the legs 4 and 6 in this embodiment is produced through the medium of a lever 20 hinged to the body 2, as at 22, and which operates within the vertical slot 24 disposed therein. Lever 20 at one end, as at 26, is connected to a fishing line 28, and at the other end, as at 30, to a fish hook 32 which, adjacent its barbed end, as at 34, is connected to the cross member 18. It will be clearly apparent that upon application of force to the line 28, lever 20 is moved into the position as shown in Figure 2 of the drawing, and which, through the medium of the hook 32, moves the legs 4 and 6 rearwardly. Accordingly, by alternate application and release of pressure to the line 28, legs 4 and 6 may be moved to simulate the natural lifelike action of a frog.

In order to facilitate return movement of the members 4 and 6 to their unextended position with respect to the body 2, lever 20, adjacent its connection to the line 28, is weighted, as at 36, so that when pressure is released upon the line 28 when the lever 20 is in the position as shown in Figure 2 of the drawing, the legs 4 and 6 are moved into position as shown in Figure 3 of the drawing. While the connection between lever 20 and cross member 18 is shown as being constituted by the hook 32, nevertheless it is to be understood that any connecting link member can be used and the hook placed in any other desired location with respect to the body 2.

The present invention contemplates a modification of the structure shown in Figures 1 and 4, such modification being shown in Figures 5 and 6 of the drawing. In this modification the body is substantially the same as shown in Figures 1 to 4, and has articulated body elements 4 and 6 to represent the rear legs of a frog, these legs being pivoted to the body 2 as at 8 and 10, and movable within a slot, such as 12, all as shown in the first described embodiment. In this embodiment, however, the ends of the legs 4 and 6 are interconnected by a bail 40 pivoted to the articulated leg elements 4 and 6, to which is connected a body element 42 formed to simulate the feet of frogs and having tubular hinge elements 44 and 46 formed to hingedly embrace the bail 40, whereby the said element 42 has swinging movement in respect thereto. Integrally formed with the member 42 is a lug 48 normally engageable with the under side of the hook 32 to limit the movement of member 42. The hook member 32, as in the first described illustration of the invention, is connected as at 50 to the bail 40 and to a lever corresponding to lever 20, all as hereinbefore set forth.

It will be quite apparent that the leg elements 4 and 6 of this embodiment are moved as previously described, and that the member 42 serves to facilitate this movement inasmuch as upon application of force to the line 28 the body 2 is moved forwardly, during which movement the foot simulating parts of member 42 apply a force through the medium of the water in which the body is operated, to further the forward movement of the body as a whole. Upon release of force to the line 28, the legs 4 and 6 are moved forwardly through the medium of lever 20 and its weighted end, during which movement the member 42 is rendered inoperative and is disposed in substantially horizontal position to offer a minimum resistance to the return of the leg members 4 and 6 to their normally unextended position in relation to the body 2.

In the use of these various embodiments, according to the invention, the same may be cast as any other artificial lure or plug, and retrieved, it being desirable in the retrieving action to make use of the structure involved to give a simulated natural action to the bait, the said action in the present instances consisting of the movement of the body elements to correspond to like elements of a natural frog. The embodiment herein disclosed may be defined as a floater type lure, although it is to be understood that by proper design of the body and operating mechanism, these devices may be used as artificial bait of the under-water type which operate slightly below the surface. It is, of course, contemplated that the lures may be properly balanced and weighted to give the desired action either under or adjacent the surface or at a substantial distance below such surface.

While I have herein described and upon the drawing shown an illustrative embodiment of the invention, it is to be understood that the invention is not limited thereto but may comprehend other constructions, arrangements of parts, details and features without departing from the spirit of the invention.

What is claimed is:

1. An artificial fishing lure, comprising a body so constructed as to simulate some natural food for fish, body elements articulatedly connected to said body, a lever pivotally connected to said body and having means adjacent one end having a direct connection to a fishing line, and a link member connected to the other end of said lever and to said elements whereby said elements are moved to simulate lifelike action thereof as said lure is moved forward by said fishing line.

2. An artificial fishing lure, comprising a body so constructed as to simulate some natural food for fish, body elements articulatedly connected to said body, a lever pivotally connected to said body and having means adjacent one end for connection to a fishing line, and a link member connected to the other end of said lever and to said elements whereby said elements are moved to simulate lifelike action thereof as said lure is moved forward by said fishing line, and said lever being weighted forwardly beyond its pivotal connection to said body to return said elements to their normal unextended position with respect to said body.

3. An artificial fishing lure, comprising a body so constructed as to simulate some natural food for fish, body elements articulatedly connected to said body, a lever pivotally connected to said body and having means adjacent one end for connection to a fishing line, and a fish hook connected to the other end of said lever and to said elements whereby said elements are moved to simulate lifelike action thereof as said lure is moved forward by said fishing line.

4. An artificial fishing lure, comprising a body so constructed as to simulate some natural food for fish, body elements articulatedly connected to said body, and articulatedly connected operating members, one of which is connected to said elements and the other of which is pivotally connected to said body and is provided with means for direct connection to a fishing line whereby said elements may be moved to simulate lifelike action upon operation of said second-named member.

5. An artificial fishing lure, comprising a body so constructed as to simulate some natural food for fish, body elements articulatedly connected to said body, a lever pivotally connected to said body for movement in a plane substantially normal to the horizontal plane of said body and having means adjacent one end having a direct connection to a fishing line, and a link member connected to the other end of said lever and to said elements whereby predetermined movement of said elements rearwardly from their normal unextended to extended position with respect to said body to simulate lifelike action is initiated upon forward movement of said body in a fluid medium due to a pull on said line.

6. An artificial fishing lure, comprising a body so constructed as to simulate some natural food for fish, body elements articulatedly connected to said body, a lever pivotally connected to said body for movement in a plane substantially normal to the horizontal plane of said body and having means adjacent one end for connection to a fishing line, and a link member connected to the other end of said lever and to said elements whereby predetermined movement of said elements rearwardly from their normal unextended to extended position with respect to said body to simulate lifelike action is initiated upon forward movement of said body in a fluid medium due to a pull on said line, and said lever being weighted forwardly beyond its pivotal connection to said body to return said elements to their normal unextended position with respect to said body.

7. An artificial fishing lure, comprising a body so constructed as to simulate some natural food for fish, body elements articulatedly connected to said body, a lever pivotally connected to said body for movement in a plane substantially normal to the horizontal plane of said body and having means adjacent one end for connection to a fishing line, and a fish hook connected to the other end of said lever and to said elements whereby predetermined movement of said elements rearwardly from their normal unextended to extended position with respect to said body to simulate lifelike action is initiated upon forward movement of said body in a fluid medium due to a pull on said line.

8. An artificial fishing lure, comprising a body so constructed as to simulate some natural food for fish, articulated body elements hingedly connected to said body, and articulatedly connected operating members, one of which is connected to said elements and the other of which is hingedly connected to said body and is provided with means for direct connection to a fishing line whereby predetermined movement of said elements rearwardly from their normal unextended to extended position with respect to said body to simulate lifelike action is initiated upon forward movement of said body in a fluid medium due to a pull on said line.

ALBERT J. DORY.